(12) United States Patent
Tombe et al.

(10) Patent No.: US 9,428,145 B2
(45) Date of Patent: Aug. 30, 2016

(54) ELECTRIC RETRACTOR AND SEATBELT DEVICE

(75) Inventors: Hideyuki Tombe, Tokyo (JP); Yutaka Hamada, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 216 days.

(21) Appl. No.: 14/115,309

(22) PCT Filed: Mar. 22, 2012

(86) PCT No.: PCT/JP2012/057377
§ 371 (c)(1),
(2), (4) Date: Feb. 10, 2014

(87) PCT Pub. No.: WO2012/150670
PCT Pub. Date: Nov. 8, 2012

(65) Prior Publication Data
US 2014/0145022 A1    May 29, 2014

(30) Foreign Application Priority Data
May 2, 2011    (JP) .................. 2011-102949

(51) Int. Cl.
*B60R 22/34* (2006.01)
*B60R 22/44* (2006.01)
*B60R 22/46* (2006.01)

(52) U.S. Cl.
CPC ........ *B60R 22/34* (2013.01); *B60R 2022/3402* (2013.01); *B60R 2022/4473* (2013.01); *B60R 2022/4666* (2013.01)

(58) Field of Classification Search
CPC ................. B60R 22/34; B60R 2022/3402
USPC ...................................... 242/390.8
See application file for complete search history.

(56) References Cited

U.S. PATENT DOCUMENTS

| | | | |
|---|---|---|---|
| 3,182,923 | A | 5/1965 | Bela Botar |
| 5,984,350 | A | 11/1999 | Hagan et al. |
| 6,152,391 | A | 11/2000 | Nagata et al. |
| 6,354,528 | B1 | 3/2002 | Nagata et al. |
| 2003/0141398 | A1 | 7/2003 | Nagata et al. |
| 2005/0082410 | A1 | 4/2005 | Tanaka et al. |
| 2009/0309345 | A1 | 12/2009 | Specht |

FOREIGN PATENT DOCUMENTS

| | | |
|---|---|---|
| CN | 1275950 A | 12/2000 |
| CN | 1334771 A | 2/2002 |

(Continued)

OTHER PUBLICATIONS

Communication pursuant to Article 93(3) EPC dated Oct. 23, 2014 issued in European Application No. 12779565.6.

(Continued)

*Primary Examiner* — Sang Kim
(74) *Attorney, Agent, or Firm* — Foley & Lardner LLP

(57) ABSTRACT

An electric retractor comprises a winding part configured to extract and wind a seatbelt that restrains an occupant, an electric driving part for extracting or winding the seatbelt by a driving of a motor, and a control part configured to control the driving of the motor, wherein respective external covers of each of the parts are electrically connected to the same potential, and at least one of the external covers is connected to a GND.

4 Claims, 4 Drawing Sheets

(56) References Cited

FOREIGN PATENT DOCUMENTS

| | | |
|---|---|---|
| CN | 1607133 A | 4/2005 |
| EP | 0 970 857 A1 | 1/2000 |
| JP | 2000 318574 A | 11/2000 |
| JP | 2005-280386 A | 10/2005 |
| JP | 2008-006998 A | 1/2008 |
| JP | 2009 126215 A | 6/2009 |
| JP | 2010-069900 A | 4/2010 |
| WO | WO-99/51469 A1 | 10/1999 |

OTHER PUBLICATIONS

Supplementary European Search Report dated Oct. 15, 2014 issued in European Application No. 12779565.6.
International Search Report dated Apr. 17, 2012 issued in connection with International Application No. PCT/JP2012/057377, including English translation.
Communication pursuant to Article 94(3) EPC dated Oct. 5, 2015 issued in EP12779565.6.
Office Action for Chinese Patent Application No. 201280021570.8 mailed Dec. 28, 2015.

ELECTRIC RETRACTOR AND SEATBELT DEVICE

CROSS REFERENCE TO RELATED APPLICATIONS

The present application is a U.S. National Stage of International Application No. PCT/JP2012/057377 filed on Mar. 22, 2012, which claims the benefit of Japanese Patent Application No. 2011-102949 filed on May 2, 2011. The entire disclosures of which are incorporated herein by reference.

BACKGROUND OF THE INVENTION

1. Field of the Invention

The present invention relates to an electric retractor and seatbelt device capable of winding a seatbelt by a driving force of a motor.

2. Description of the Related Art

There are known electric retractors capable of winding a seatbelt by a driving force of a motor. Various electrical devices subject to communication and driving and provided to the vehicle body, including the motor of this electric retractor, are normally connected to an ECU (Electronic Control Unit) comprising a microcomputer and an IC via a harness, and controlled by the ECU.

Noise, however, is generated from members such as the above described ECU, driving devices such as the above described motor, and harnesses. This noise, as radiation noise radiated to radio waves and the like, affects the operation of electronic devices, causing static to be mixed into the sound of a vehicle-mounted radio, for example. Hence, in a prior art, to prevent such noise from affecting electronic devices, the view has been to provide a noise eliminating filter circuit, such as a low pass filter (LPF) for eliminating noise, to one of two power supply lines of the motor driving circuit (refer to JP, A, 2008-006998, for example).

SUMMARY OF THE INVENTION

Nevertheless, it is extremely difficult to cope with all noise sources, including the aforementioned ECU, harness, and the like, by simply providing a noise eliminating filter circuit to a power line of the motor driving circuit. Further, providing a noise eliminating filter circuit results in problems such as an increase in the size of the motor driving circuit, an inability to effectively utilize the small amount of installation space of a vehicle body, and a sudden jump in costs. Furthermore, while covering driving devices such as a motor with a cover to achieve shielding is also conceivable, securing space to provide such a cover for shielding is extremely difficult.

Note that while, according to the above described prior art, priority is placed on suppressing the noise (radiation noise) generated by an electronic device (motor driving circuit), suppressing the effect (malfunction, etc.) that external noise coming from external sources has on the electronic device itself also needs to be taken into consideration.

It is therefore an object of the present invention to provide an electric retractor and seatbelt device capable of improving the noise resistance of an electronic device by an inexpensive and simple configuration.

Means for Solving the Problems

In order to achieve the above-described object, according to the first invention, there is provided an electric retractor comprising a winding part configured to extract and wind a seatbelt that restrains an occupant, an electric driving part for performing at least one of extracting or winding the seatbelt by a driving of a motor, and a control part configured to control the driving of the motor, wherein respective external covers of the winding part, the electric driving part, and the control part are connected to the same potential, and at least one of the external covers is connected to a GND, thereby constituting a noise shield.

According to the electric retractor of the present invention, it is possible to improve the noise resistance of an electronic device with just an inexpensive and simple configuration.

According to the second invention, in the electric retractor according to the first invention, the winding part, the electric driving part, and the control part are configured so that the other of the external covers of each the part are coupled to one of the external covers of each the part via a conductive coupling member.

According to the electric retractor of the present invention, it is possible to electrically set each part to the same potential by a minimum coupling structure.

According to the third invention, in the electric retractor according to the first or second invention, each of the external covers is connected to the GND by means of using one ground terminal.

According to the fourth invention, in the electric retractor according to the first invention, the control part is internally connected to the GND.

In order to achieve the above-described object, according to the fifth invention, there is provided a seatbelt device comprising a seatbelt configured to restrain an occupant, a retractor capable of winding the seatbelt, a buckle connected to a securing side member, and a tongue configured to engage with the buckle, provided to the seatbelt, wherein the retractor comprises a winding part configured to extract and wind the seatbelt that restrains an occupant, an electric driving part for extracting or winding the seatbelt by a driving of a motor, and a control part configured to control the driving of the motor, and respective external covers of the winding part, the electric driving part, and the control part are connected to the same potential, and at least one of the external covers is connected to a GND, thereby constituting a noise shield.

Advantages of the Invention

According to the present invention, it is possible to improve the noise resistance of an electronic device with just an inexpensive and simple configuration.

DETAILED DESCRIPTION OF THE PREFERRED EMBODIMENTS

Figure 1:
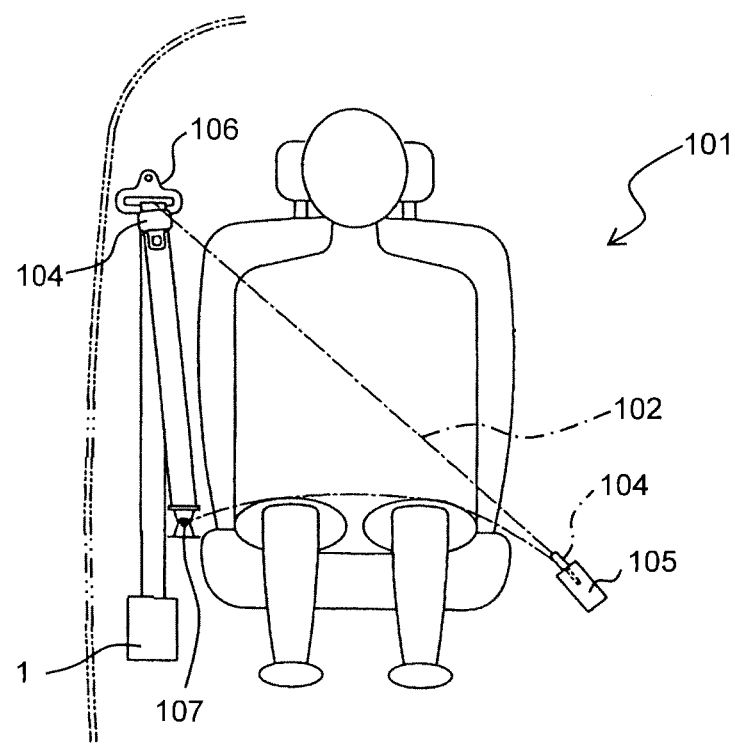
FIG. 1 is a front view showing the overall structure of a seatbelt device comprising an embodiment of the electric retractor of the present invention, along with an occupant.

An embodiment of the present invention will now be described with reference to accompanying drawings. FIG. 1 is a front view showing the overall structure of a seatbelt device comprising an electric retractor of an embodiment of the present invention, along with an occupant.

In FIG. 1, a seatbelt device 101 comprises a seatbelt (webbing) 102, an electric retractor 1 that extractably winds one side of this seatbelt 102, a tongue 104 slidably provided to the seatbelt 102, and a buckle device 105 that engages with this tongue 104. The seatbelt 102 is wound on one side by the electric retractor 1, passes through a shoulder anchor 106 midway, and is pivotably connected to a vehicle body 108 side by a latch 107 on the other side end.

Figure 2:
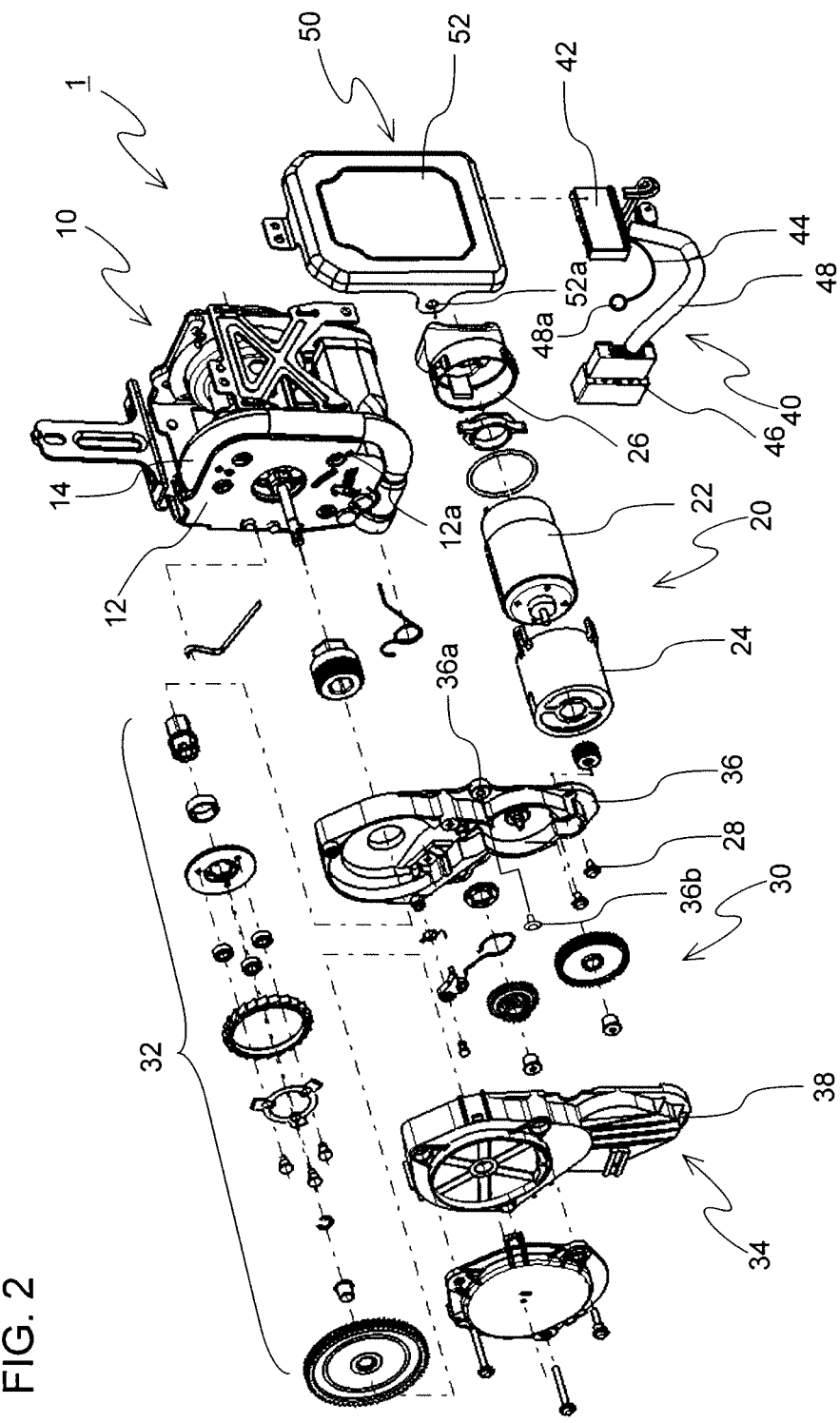
FIG. 2 is an exploded perspective view of the main parts, showing an embodiment of the electric retractor of the present invention.

FIG. 2 is an exploded perspective view of the main parts, showing an embodiment of the electric retractor related to an embodiment of the present invention.

In FIG. 2, the electric retractor 1 comprises a winding part 10 that extracts and winds the above described seatbelt 102, an electric driving part 30 that forcibly winds the extracted seatbelt 102 by a driving of a motor 20, and a control part (hereinafter suitably referred to as "ECU") 50 that controls the driving of the motor 20.

Communication harnesses such as CAN and local communication harnesses (so-called K-line, LIN, and the like), various vehicle sensors (such as a collision prediction sensor, brake sensor, steering angle sensor, spool sensor, buckle switch, and door switch) that detect each vehicle body part, the above described winding motor, a vehicle-mounted battery, and the like are connected to the ECU 50, for example, and power supply as well as transmission and reception of arbitrary electrical signals are performed. In this example, the above described power supply and the above described transmission and reception of electrical signals are performed via a harness 40 connected to the ECU 50.

The winding part 10 used is a known winding part, permitting extraction of the seatbelt 102 during normal periods, obstructing (locking) further extraction of the seatbelt 102 in response to a sudden pulling force in the extracting direction, and winding the extracted seatbelt 102 when not in use. Further, the necessary area of the configured mechanism for performing each operation, including the extraction, locking, and winding of the seatbelt 102, is covered by a retractor cover 12 serving as an external cover made of a conductive metal material. Furthermore, when the occupant is restrained by the extracted seatbelt 102, the winding part 10 may use an actuator 14 of a powder-type driving device or the like, for example, as a seatbelt pretensioner function that prevents slack by pulling the seatbelt 102, which is extracted and restraining the occupant, in the winding direction.

The motor 20 comprises an electric motor main body 22, a motor cover 24 that covers an output side end and body of the electric motor main body 22, a motor base cover 26 that covers the connecting terminal side end of the electric motor main body 22, and a screw 28 made of a conductive material for securing the electric motor main body 22 to the electric driving part 30 integrally with the motor cover 24. Note that the output of the electric motor main body 22 is power transmitted in the interior of the electric driving part 30. Further, while the cladding itself of the electric motor main body 22 functions as an external cover, the motor cover 24 may serve as the external cover and be made of a conductive metal material, a flange (not shown) for securing the motor cover may be formed on the motor cover 24, and the motor cover 24 may be secured to the electric driving part 30 with the electric motor main body 22 singly retained.

The electric driving part 30 comprises a driving mechanism part 32 that forcibly drives the winding part 10 independently from at least each operation of the winding part 10 during normal periods by the power transmission of the electric motor main body 22, and an MSB housing 34 as an external cover that stores the driving mechanism part 32. Further, the MSB housing 34 comprises a base 36 made of a conductive metal material, and a cover 38 that covers the driving mechanism part 32 in coordination with the base 36. Note that the forced driving of the winding part 10 by the aforementioned electric motor main body 22 is not limited to forced operation in one direction (the winding direction) only, such as the forced winding of the extracted seatbelt 102 as well as the winding after forced extraction of the extracted seatbelt 102, depending on the control of the ECU 50 described later.

The harness 40 comprises an external-side connector 42 connected to the ECU 50, an internal-side connector 46 connected to a vehicle body-side connector (not shown), and a harness main body 44 that connects the external-side connector 42 and the internal-side connector 46. Furthermore, a power supply line connected to a power supply circuit (not shown) that supplies power from the vehicle-mounted battery to the ECU 50, a control line connected to a main control circuit (not shown) that electronically controls the electronic devices of the overall vehicle, including the ECU 50, and various signal lines such as a detection signal line for inputting the above described electrical signals from the above described various vehicle sensors to the ECU 50 are connected to the vehicle body-side connector that connects the internal-side connector 46, for example. At this time, each of the aforementioned lines may be connected to the ECU 50 using the single harness 40 or a plurality of harnesses. Further, the electrical signals from the above described vehicle sensors may be directly input into the ECU 50 by the detection signal line or by the control line via the main control circuit. Furthermore, the power supply circuit controls the power supply to the electronic devices of the overall vehicle that are controlled by the main control circuit. In this embodiment, this power supply circuit includes the main control circuit, and the main control circuit supplies power from the vehicle-mounted battery and electronically controls the electronic devices of the overall vehicle.

The ECU 50 used is a functionally known ECU, and is installed separately from the ECU for the airbag device (not shown), for example. In this embodiment, the ECU 50, as one example of the function thereof, is capable of increasing the restraining effect on the occupant by controlling and causing the electric motor main body 22 to wind the seatbelt 102. That is, the ECU 50 receives a predetermined output signal that serves as a driving trigger (for example, an output signal from another ECU, etc., in accordance with the collision prediction signal from the collision prediction sensor, an output signal from the buckle switch, door switch, or the like) via the above described harness 40. On the other hand, the ECU 50 receives power supply from the vehicle-mounted battery directly (or indirectly via the main control circuit or the like) via the harness 40. Then, with reception of the above described output signal via the above described harness 40, the ECU 50 controls the driving of the electric motor main body 22 based on the above described supplied power, causing it to wind the seatbelt 102. Note that the ECU 50 is covered by an external cover 52 made of a conductive metal material.

Then, the winding part 10, the electric driving part 30, and the ECU 50 are, for example, connected by a screw 36*b* (coupling member) that passes through a fastening point 36*a* provided to the base 36 of the electric driving part 30 and a through-hole 52*a* provided to the external cover 52, screws into a screw hole 12*a* provided to the retractor cover 12, and is made of a conductive material.

Further, a GND harness 48 of a ground terminal or the like is provided to the external-side connector 42 as connection to GND potential.

In the above basic configuration, according to this embodiment, the electric motor main body 22, the harness 40, and the ECU 50 are radiation noise sources. In the following description, suitably the electric motor main body 22, the harness 40, and the ECU 50 are singly referred to as the "radiation noise sources." The main part of this embodiment lies in connecting the radiation noise sources of the electric retractor 1 to a GND. The following describes the details of the connection structure thereof.

GND connection of the radiation noise sources in this embodiment is realized as described below. That is:
- (A) The electric driving part 30 and the motor 20 are electrically connected by the screw 28.
- (B) A round terminal 48*a* of the GND harness 48 connected to an external GND (the external-side connector 42) is connected to the fastening point 36*a* of the electric driving part 30, and the motor 20 is set to the GND potential.
- (C) The electric driving part 30 and the winding part 10 are electrically connected, and the winding part 10 assembled to the vehicle is connected to a GND.
- (D) The ECU 50 is electrically connected via the electric driving part 30 and the screw 36*b*, and connected to a GND.

As a result of the above described (A)-(D), in this embodiment, it is possible to connect the winding part 10, the motor 20, the electric driving part 30, the harness 40, and the ECU 50 to the GND by the single GND harness 48. With this arrangement, the entirety, including the noise sources, becomes a GND potential and is shielded, alleviating the effect of the noise generated from the noise sources. Furthermore, it is also possible to prevent external noise (static electricity, radio emissions, and the like) that comes from external sources from affecting the electric retractor 1. That is, it is possible to prevent the occurrence of malfunction caused by noise (static electricity and radio waves) and the like impressed on the ECU 50. In particular, since strengthening the GNG substrate of the ECU substrate and using ESD protection elements, which had been required to date to prevent the above described external noise, are no longer required, it is possible to avoid an increase in the number of parts and an increase in the substrate size. As a result of the above, according to this embodiment, it is possible to prevent noise that radiates from the electric retractor 1 to the outside as well as noise that comes from external sources to the electric retractor 1, and thus improve the noise resistance of the electric retractor 1.

Note that the present invention is not limited to the above described embodiment and various modifications may be made without deviating from the spirit and scope of the invention. The following describes such modifications one by one.

(1) Connecting GND Potential from the Internal GND of the ECU 50 Via the Harness 40

Figure 3:
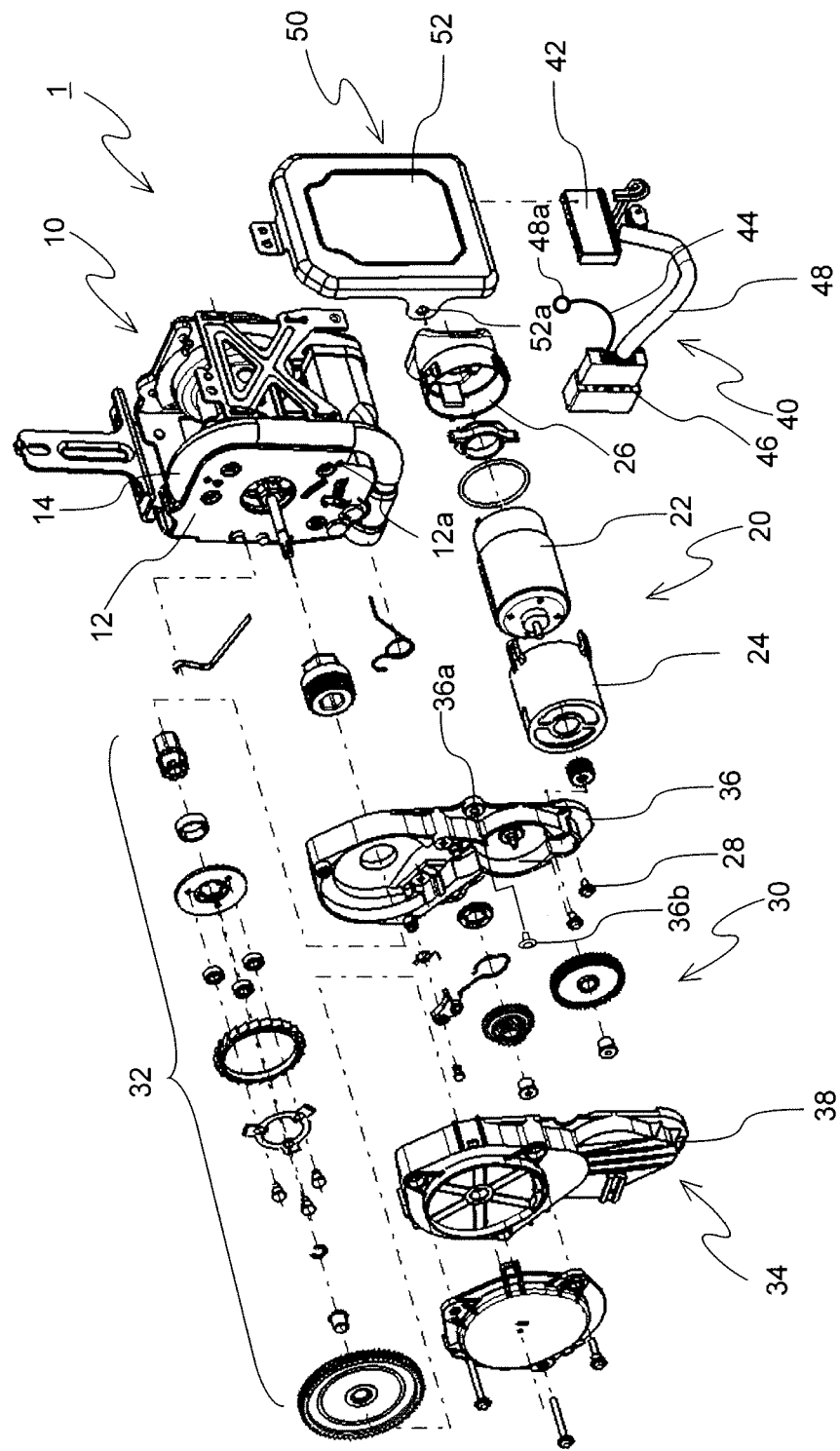
FIG. 3 is an exploded perspective view of the main parts, showing modification 1 of the electric retractor of the present invention.

FIG. 3 is an exploded perspective view of the main parts, showing an electric retractor of this modification. In this modification, as shown in FIG. 3, the round terminal 48*a* of the GND harness 48 is connected to the internal-side connector 46.

The GND connection of the radiation noise sources in this modification is realized as described below (details that are the same as the above described embodiment are given the same item names). That is:
- (A) The electric driving part 30 and the motor 20 are electrically connected by the screw 28.
- (B') The round terminal 48*a* of the GND harness 48 connected to an internal GND (the internal-side connector 46) of the ECU 50 is connected to the fastening point 36*a* of the electric driving part 30, and the motor 20 is set to the GND potential.
- (C) The electric driving part 30 and the winding part 10 are electrically connected, and the winding part 10 assembled to the vehicle is connected to a GND.
- (D) The ECU 50 and the electric driving part 30 are electrically connected via the screw 36*b*, and the ECU 50 is connected to a GND.

As a result of the above described (A), (B'), (C), and (D), in this modification as well, it is possible to connect the winding part 10, the motor 20, the electric driving part 30, the harness 40, and the ECU 50 to the GND by the single GND harness 48. With this arrangement, the potential of the noise sources becomes the GND potential, shielding the entirety and making it possible to improve noise resistance.

Figure 4:
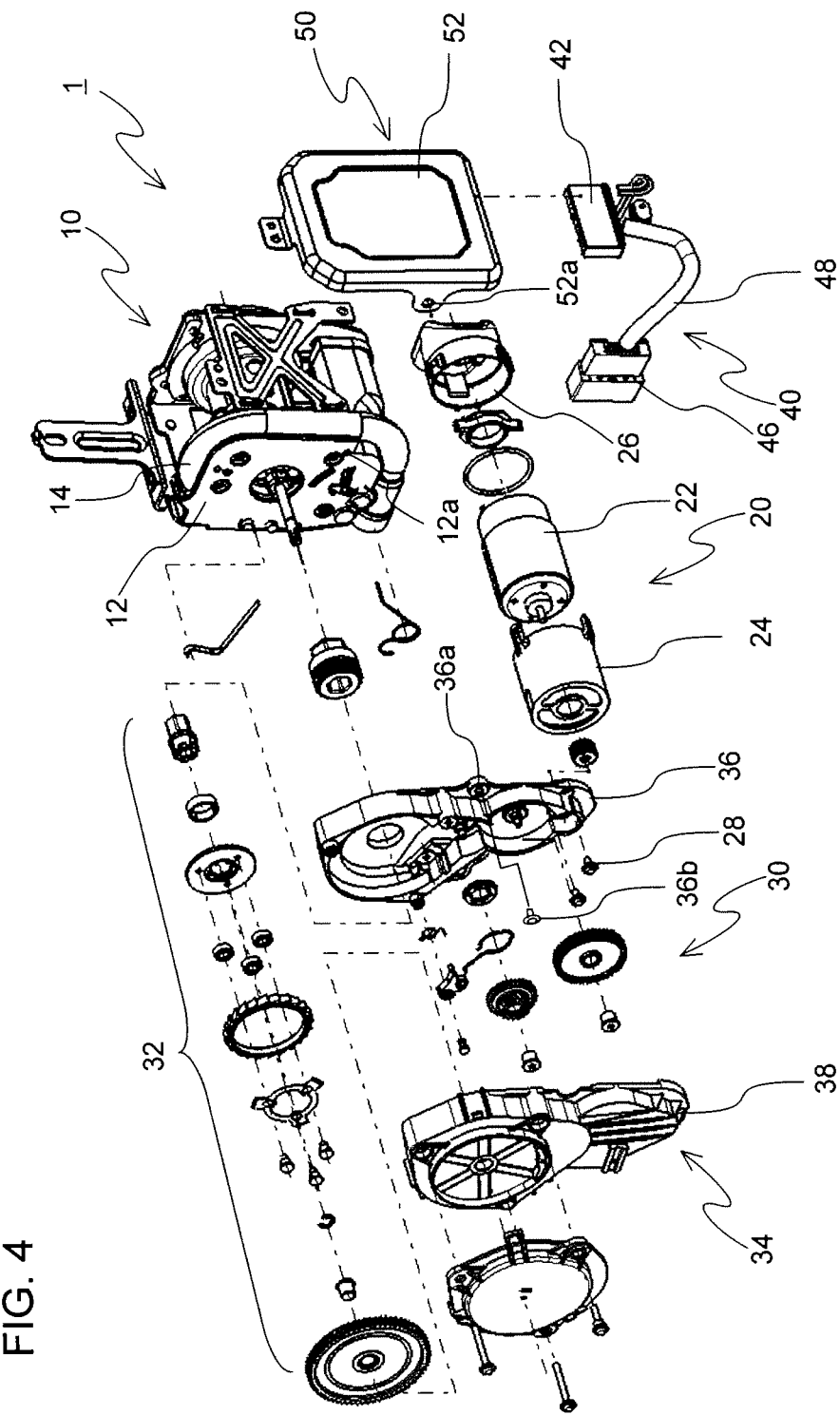
FIG. 4 is an exploded perspective view of the main parts, showing modification 2 of the electric retractor of the present invention.

(2) Internally Connecting the ECU 50 to a GND, Thereby Connecting the GND and Others Via the ECU 50 Installation Part (Refer to FIG. 4)

FIG. 4 is an exploded perspective view of the main parts, showing an electric retractor of this modification.

The GND connection of the radiation noise sources in this modification is realized as described below (details that are the same as the above described embodiment are given the same item names). That is:
- (A) The electric driving part 30 and the motor 20 are electrically connected by the screw 28.
- (B") The motor 20 is set to the GND potential by connecting the ECU 50 housing to the fastening point 36*a* of the electric driving part 30 (by electrically connecting the ECU 50 to the GND in the interior of the ECU 50).
- (C) The electric driving part 30 and the winding part 10 are electrically connected, and the winding part 10 assembled to the vehicle is connected to a GND.
- (D) The ECU 50 is electrically connected via the electric driving part 30 and the screw 36*b*, and connected to a GND.

As a result of the above described (A), (B"), (C), and (D), in this modification as well, it is possible to connect the winding part 10, the motor 20, the electric driving part 30, the harness 40, and the ECU 50 to the GND. With this arrangement, the potential of the noise sources becomes the GND potential, shielding the entirety and making it possible to improve noise resistance.

(3) Other

However, in a case of the winding part 10 that utilizes an actuator driving method, as a countermeasure for reducing radiation sources in order to suppress the radiation noise by the actuator driving, the winding part 10 is connected to a GND to set it to the same potential. With this arrangement, since the electric driving part 30 connected to the winding part 10 and the ECU 50 are both connected to a GND, the configuration may be designed so that each of the radiation noise sources is ultimately connected to a GND to constitute a noise shield, thereby improving noise resistance.

Further, in a case of a mechanically and electrically integrated electric driving part 30 that is integrated with the winding part 10 and the ECU 50 as a method for setting the winding part 10, the electric driving part 30, and the ECU 50 to the same potential, the configuration may be designed so that a structural design that electrically connects the radiation noise sources is established and any one radiation noise source is connected to a GND, thereby ultimately connecting each of the radiation noise sources to the GND to constitute a noise shield and thus improve noise resistance. At this time, as the electric connection method, the provision of a contact using a conductive metal (a screw or the like) is favorable since it permits the establishment of an inexpensive and simple configuration.

Furthermore, the noise radiation sources may be connected to a GND by connecting the external cover 52 of the ECU 50 to the GND in the ECU interior. At this time, the GND connection may be made directly from the harness 40 or from the internal GND of the ECU 50. Further, in a case where there is concern of a voltage short or the like in the harness 40 with a direct GND connection, it is possible to prevent the flow of overcurrent even in the unlikely event that a defect such as a voltage short occurs by inserting a capacitor between each connecting portion of the winding part 10, the motor 20, the electric driving part 30, and the ECU 50. Further, the capacitor may be mounted between harnesses or mounted in the interior of the ECU 50. If the capacitor is mounted in the interior of the ECU 50, the connection becomes an ECU GND-Capacitor-GND connection array.

What is claimed is:

1. An electric retractor comprising:
a winding part configured to extract and wind a seatbelt that restrains an occupant;
an electric driving part for performing at least one of extracting or winding said seatbelt by a driving of a motor; and
a control part configured to control the driving of said motor, wherein:
an external cover of said winding part, an external cover of said electric driving part, and an external cover of said control part are coupled with each other by a first screw,
an external cover of said motor and said external cover of said electric driving part are coupled with each other by a second screw, and
a round terminal for connecting said external covers to a GND is connected to said first screw at the portions that said external cover of said winding part, said external cover of said electric driving part, and said external cover of said control part are coupled by said first screw.

2. The electric retractor according to claim 1 wherein:
each of said external covers is connected to the GND by means of using said round terminal.

3. The electric retractor according to claim 1, wherein:
said control part is internally connected to the GND.

4. A seatbelt device comprising:
a seatbelt configured to restrain an occupant;
a retractor capable of winding said seatbelt;
a buckle connected to a securing side member; and
a tongue configured to engage with said buckle, provided to said seatbelt, wherein:
said retractor comprises:
a winding part configured to extract and wind said seatbelt that restrains an occupant;
an electric driving part for extracting or winding said seatbelt by a driving of a motor; and
a control part configured to control the driving of said motor, wherein
an external cover of said winding part, an external cover of said electric driving part, and an external cover of said control part are coupled with each other by a first screw,
an external cover of said motor and said external cover of said electric driving part are coupled with each other by a second screw,
a round terminal for connecting said external covers to a GND is connected to said first screw at the portions that said external cover of said winding part, said external cover of said electric driving part, and said external cover of said control part are coupled by said first screw.

* * * * *